United States Patent Office 3,838,063
Patented Sept. 24, 1974

3,838,063
NOVEL COMPOUNDS AND PIGMENT
COMPOSITIONS EMBODYING SAME
Theodore H. Foss, Chicago, Ill., assignor to
Lawter Chemicals, Inc.
No Drawing. Continuation of abandoned application Ser.
No. 49,205, June 23, 1970. This application Mar. 9,
1972, Ser. No. 233,327
Int. Cl. C09k 1/02
U.S. Cl. 252—301.2 R  4 Claims

ABSTRACT OF THE DISCLOSURE

This invention is addressed to novel triazines including tetra-2,2,6,6-(2,4-diamino - s - triazino - 6 - ethyl)cyclohexanone, tetra - 2,2,5,5-(2,4-diamino-s-triazino-6-ethyl) cyclopentanone and 3,3-di(2,4-diamino - s - triazino - 6-ethyl)-2-propanone which can be formulated into pigment compositions by co-condensing the novel compounds of the invention with an aryl sulfonamide and an aldehyde to provide a new and improved resinous material for use in daylight fluorescent compositions having improved light stability.

---

This is a continuation of application Ser. No. 49,205, filed June 23, 1970, now abandoned.

This invention relates to daylight fluorescent materials, and more particularly to new and improved resinous materials employed in combination with daylight fluorescent dyestuffs in the preparation of improved pigments and vehicles for inks, paints and the like.

Fluorescent dyestuffs have heretofore been used in the manufacture of daylight fluorescent pigments and coatings for use in silk screen printing, letter-press inks, paints and the like. While fluorescence of the dyestuffs has remained to impart the desired increase in color intensity when such materials have been employed on suitable bases or carriers limited to indoor exposure, the fluorescigenous energy of the dyestuffs has been found to be a daylight fluorescent material which is subject to exposure to direct rays of the sun and to elements existing in the ambient atmosphere. In some instances, the fluorescence is lost within the matter of a few days of outdoor exposure.

Considerable research has been expended with a view towards increasing the fluorescent life of the various daylight fluorescent materials employed in ink or other coating compositions and particularly with respect to their stability for outdoor exposure. To the present, some success has been achieved by componding the dyestuff with a resinous material in which the dyestuff is soluble to form a pigment to be incorporated in an ink or paint composition. The resinous material is believed to provide a protective coating for the dyestuff to minimize its destruction or deterioration upon exposure to normal atmospheric conditions.

Very few of the large number of resinous materials available on the market have been found to be capable of use in the formulation of pigments or vehicles containing the daylight fluorescent dyestuff. Some success has been achieved by the incorporation of the daylight fluorescent material in the matrix of a thermosetting resinous product, such as the condensation reaction product of urea or melamine with a formaldehyde or a condensation product formed by the reaction of a polybasic acid and polyhydric alcohol, as in the polyester resins. When formulated of such thermosetting resinous materials, the daylight fluorescent dyestuff is embodied in the resinous system while the latter is in a fluid state for solution or distribution therein. In the manufacture of a pigment, the resinous carrier is subsequently advanced to an infusible and insoluble stage where it can be ground down to the desirable particle size.

While daylight fluorescence is extended by pigmentation in the manner described, the life of the daylight fluorescent material still remains insufficient from the standpoint of the cost of the pigment and the cost of the ink or coating compositions fabricated thereof.

The fluorescent life of the pigment or coating has also been improved by the formulation of the daylight fluorescent dyestuffs in a thermoplastic resinous material of the type represented by polyvinyl acetate and vinyl acetate-vinyl chloride copolymers. However, considerable difficulty has been experienced in the use of thermoplastic resinous materials of the type described since the latter soften under the temperature conditions developed in grinding down to form the pigment with the result that the material is unsuccessfully ground down unless extensive precautions are taken to minimize temperature rise. Such resins are not amendable to commercial practice.

Substantial improvements in aryl sulfonamide systems have been achieved by the resinous system disclosed in Reissue Pat. No. 25,845, in which description is made of the formulation of a daylight fluorescent pigment or vehicle with a resinous base formed of the co-condensation reaction product of benzoguanamine (2,4-diamino-6-phenyl triazine-1,3,5) and formaldehyde with an aryl sulfonamide and formaldehyde.

While the resinous system embodying benzoguanamine represents a significant improvement over earlier thermoplastic resinous systems, it nevertheless leaves room for further improvements, particularly from the standpoint of light fastness and thermal stability.

In is accordingly an object of the present invention to provide new and improved triazine compounds which can be co-condensed with an aryl sulfonamide and an aldehyde to provide a resinous system for use with daylight fluorescent compositions having further improved stability to light.

It is a related object of the present invention to produce and to provide a method for a new and improved daylight fluorescent composition having improved stability to light and outdoor exposure for use in the preparation of printing inks, paints, moldable plastic compositions and the like.

The concepts of the present invention reside in new and improved triazine compounds which can be co-condensed with an aryl sulfonamide and an aldehyde to provide a new and improved resinous material for use in a daylight fluorescent composition. It has been found that daylight fluorescent compositions embodying the novel compounds of the invention as a component of the resinous base exhibit a heretofore unattainable stability with respect to exposure to light and outdoor conditions.

The novel triazines of the present invention include triazino-substituted cyclic ketones having the formula:

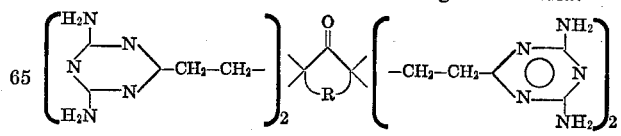

wherein R is dimethylene or trimethylene, and a triazino-substituted propanone of the formula:

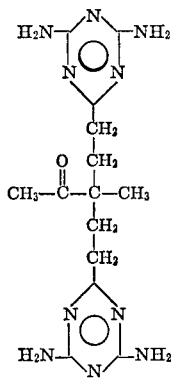

The triazino-alkyl-substituted cyclopentanone and cyclohexanone compounds can be conveniently prepared by reacting tetra(beta-cyanoethyl)cyclopentanone or cyclohexanone with dicyanodiamide in the presence of an alkali metal hydroxide in accordane with the following:

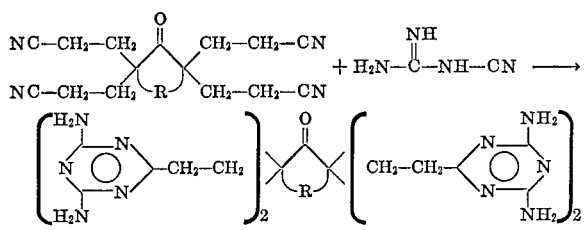

The tetra(beta-cyanoethyl)cyclopentanone and cyclohexanone can be prepared in accordance with the methods disclosed in U.S. Pat. No. 2,386,737.

The triazino-alkyl-substituted methyl ethyl ketone compound of the present invention can be prepared in a similar manner in which dicyanodiamide is reacted with 4-acetyl-2-methyl pimelonitrile in accordance with the following:

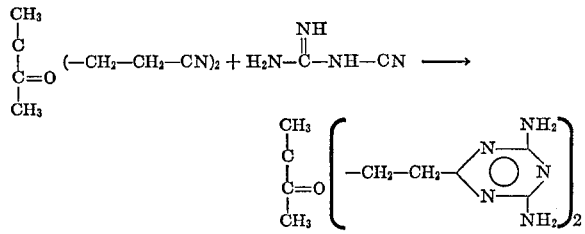

The 4-acetyl-4-methyl pimelonitrile for use in the preparation of the triazino-alkyl methyl-ethyl ketone compound can be prepared from the reaction of acrylonitrile and methyl ethyl ketone in the presence of an alcoholic base in accordance with the following reaction:

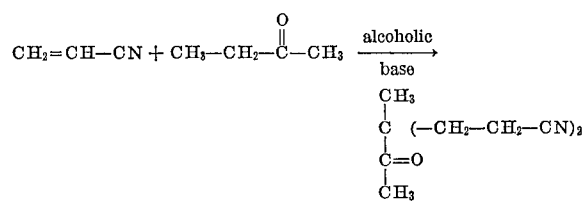

In accordance with the practice of the invention, a daylight fluorescent composition is formulated to include a daylight fluorescent dyestuff with a resinous base formed of the co-condensation reaction product of one of the above triazine compounds with an aryl sulfonamide and an aldehyde. The amount of the triazine compound used for reaction with the aryl sulfonamide and aldehyde should be an amount sufficient to react with the sulfonamide in the presence of the aldheyde to form a resinous polymer having a melting point which is sufficiently high to resist melting or plasticity at the temperatures to which the composition is exposed, e.g., the temperature of drying in the case of a printing ink.

The novel triazine compounds of the present invention are generally employed in an amount to provide a mole ratio of less than one mole of the triazine compound per mole of aryl sulfonamide, with best results being achieved when the novel triazine compounds of the invention are employed in a ratio of between 1.0 and 15.0 moles of triazine compound per 100 moles of aryl sulfonamide.

As used herein, the term "daylight fluorescent dyestuffs" is meant to include such materials as xylene Red B (2,4 disulfo benzoic acid or 2,5 disulfo benzoic acid), Rhodamine 6 GDN (ethyl ester of m-monoethylamine phenolphthalein hydrochloride), Azosol Yellow 6 GF(4 amino 1,8 naphtho 2',4' dimethyl phenyl imide), Brilliant Sulfoflavine FFA (3 sulfo 4 amino 1,8 naphthol 4' methyl phenyl imide sodium salt), Rhodamine RX (meta-diethyl amino phenolphthalein hydrochloride) having the general formula:

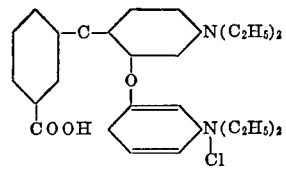

It will be understood that the above are merely representative and that other recognized daylight fluorescent dyestuffs may also be included under the term which will hereinafter be employed in the specification and in the claims.

The amount of the daylight fluorescent dyestuff described above which can be used in the pigment composition of the present invention is not critical and can be varied within wide ranges. It is generally desirable that the pigment compositions of the present invention contain sufficient quantities of daylight fluorescent dyestuff to impart daylight fluorescence to the pigment composition. Generally, these dyestuffs are incorporated into the composition until they constitute .01 to 5% by weight.

As the aryl sulfonamide, it is generally preferred to make use of para-toluene sulfonamide, although use can be made of a wide variety of other aromatic sulfonamides. Representative of suitable aryl sulfonamides include benzene sulfonamide, o-toluene sulfonamide, naphthalene trisulfonamide as well as mixtures thereof. If desired, the aryl sulfonamide can be incorporated into the pigment composition as such for reaction with the aldehyde, or in the form of a pre-condensation reaction product with an aldehyde to an intermediate stage of polymeric growth. Generally, the aryl sulfonamide and the aldehyde can be reacted in equimolar proportions although use can be made of an amount of aldehyde corresponding to a 200% excess.

As the aldehyde, use is preferably made of formaldehyde or its polymerization product para-formaldehyde. Use can also be made of other aldehydes as represented by benzaldehyde, glyoxal, pyruvic aldehyde and acid aldehyde. In general, however, the latter aldehyde are less desirable because they provide a pigment composition having less desirable characteristics from the standpoint of friability and hardness.

The following examples will represent the preparation of the novel compounds of the present invention as well as their use in preparing pigment compositions and paint and ink compositions embodying the pigment composition of the present invention.

It will be understood that the following examples are shown by way of illustration, but not of limitation of the principal concepts of the invention.

EXAMPLE 1

Preparation of tetra(beta-cyanoethyl)cyclohexanone

Tetra(beta-cyanoethyl)cyclohexanone is prepared in accordance with the method described in U.S. Pat. No.

2,386,737. Thus, 490 g. of cyclohexane are stirred with 25 g. of a solution of 40% by weight trimethylbenzyl ammonium hydroxide under nitrogen. Freshly distilled acrylonitrile is added dropwise to the mixture over a period of 4 hours while maintaining the temperature of the mixture within the range of 30 to 35° C. by external cooling. The reaction mixture is then allowed to stand for 18 hours, after which it is acidified with dilute HCl to a pH of just under 7. The tetra(beta-cyanoethyl-cyclohexanone precipitates from the reaction mixture, and is separated therefrom by filtration.

The crystals of tetra(beta-cyanoethyl)cyclohexanone are then recrystalized in methyl Cellosolve, and dried in an oven overnight at 170° C. The yield is 110.7 g. and the product has a melting point of 162 to 162.5° C. Analysis confirms the product to be 1,1,6,6-(2-cyanoethyl)cyclohexanone.

EXAMPLE 2

Preparation of 1,1,6,6-tetra(2,4-diamino-s-triazino-6-ethyl)cyclohexanone 100 grams of the tetra(beta-cyanoethyl)cyclohexanone prepared in Example 1 are dissolved in 300 cc.'s of methyl Cellosolve, and 5 grams of KOH are added. Then 118 grams of dicyanodiamide are added, and the reaction mixture is covered with a nitrogen blanket. The reaction mixture is refluxed for 1½ hours.

Thereafter, an additional 24 grams of dicyanodiamide are added to the reaction mixture. Almost immediately after addition of the dicyanodiamide, the product begins to separate out. The yield is 174 grams, with a percent yield of theoretical of 87% based upon a theoretical yield of 198 grams. The product has a melting point of 299° to 304° C., and infra-red analysis indicates the structural formula to be:

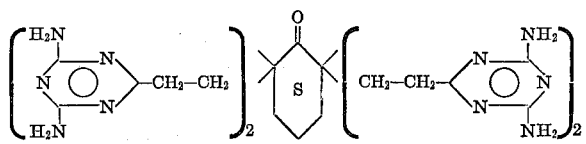

EXAMPLE 3

Preparation of Daylight Fluorescent Pigment (Pink)

This example illustrates the preparation of a daylight fluorescent pigment composition embodying the following components:

| | G. |
|---|---|
| Paratoluenesulfonamide | 100.0 |
| Tetra- beta - (2,4-diamino-s-triazino-6-ethyl)cyclohexanone | 33.0 |
| Paraformaldehyde | 30.7 |
| Water | 25.0 |
| Rhodamine B | 1.3 |
| Phthalic anhydride | 0.5 |

Procedure

The paratoluenesulfonamide (0.585 moles), the tetra-[beta - (2,4-diamino-s-triazino-6) - ethyl] cyclohexanone (0.0571 moles) and the paraformaldehyde are charged to a reaction vessel, and heated to a temperature of 235° F. to reduce the materials to a molten state until the components are thoroughly mixed. Thereafter, the water is added and the resulting mixture is reheated to 212° F. The Rhodamine dye is added when the temperature of the mixture is 212° F., and the phthalic anhydride catalyst when the temperature is 215° C. Then the mixture, at a temperature of 220° F., is placed in a tray and dried in an oven for curing at a temperature of 265° F.

The resulting daylight fluorescent resinous material is hard and brittle, and is insoluble in acetone.

EXAMPLE 4

Preparation of a Silk Screen Lacquer from Pigment of Example 3

A lacquer composition is formulated in include the following:

| | Percent by wt. |
|---|---|
| Polyacrylic resin solution (Acryloid F–10) | 55.0 |
| Pigment of Example 3 | 40.0 |
| Dried expanded silica gel (Santocel 54) | 0.8 |
| Mineral spirits | 4.2 |

The above ingredients are mixed and ground down over a three-roll mill. The resulting silk screen ink has a pink shade, and can be effectively used in silk screen printing and the like.

EXAMPLE 5

Preparation of 4-acetyl-4-methylpimelonitrile

A mixture of 144 g. of methyl ethyl ketone, 200 g. of tertiarybutyl alcohol and 10 g. of a 40% by weight KOH solution in methanol is charged to a reaction vessel and maintained at 5° C. Thereafter, a solution of 160 g. of acrylonitrile and 100 g. of tertiarybutyl alcohol is added dropwise to the mixture, with continuous stirring. Care is taken to insure that the reaction temperature does not exceed 5° C. During the addition of the acrylonitrile-alcohol solution, a crystalline solid separates from the solution.

After all of acrylonitrile is added, the resulting mixture is stirred for 2 hours while the temperature is maintained in the range of 5 to 10° C. The reaction mixture is allowed to warm up to room temperature overnight whereby a clear solution results. This clear solution is cooled to a temperature of about 5° C., and a crystalline solid precipitates from the solution. The precipitate is filtered and dried for 2 days at room temperature.

The yield is 200 g. of the product. I. R. analysis reveals that the product is 4-acetyl-4-methylpimelonitrile.

EXAMPLE 6

Preparation of 3,3-di(2,4-diamino-s-triazino-6-ethyl) 2-butanone

A mixture of 210 g. of 4-acetyl-4-methylpimelonitrile prepared in the manner described in Example 5 and 227.8 g. of dicyanodiamide is charged to a reaction vessel containing 450 ml. of methyl cellulose, and the resulting mixture is maintained under a nitrogen blanket. Thereafter, the mixture is stirred and heated. At a temperature of about 105° C., nearly all of the contents of the reaction vessel were in solution. The solution is heated to reflux temperature, and, after about 5 to 10 minutes, a precipitate begins to separate from the solution. 50 ml. of solvent is added to the solution which is then refluxed for 4 hours.

The precipitate is then filtered, slurried in hot water, filtered again and dried. The yield is 389.7 g. as compared to theoretical yield of 408 g., for a percent of yield of 95.6%.

EXAMPLE 7

Preparation of Daylight Fluorescent Pigment (Orange)

A daylight fluorescent pigment composition is prepared containing the following:

| | G. |
|---|---|
| Paratoluenesulfonamide | 100.0 |
| 3,3-di(2,4-diamino-s-triazino-6-ethyl)-2-butanone | 17.3 |
| Paroformaldehyde | 30.5 |
| Water | 25.0 |
| Rhodamine BX | 0.8 |
| Rhodamine 76 | 0.7 |
| Brilliant yellow 6G Base | 1.5 |

The procedure utilized in Example 3 is followed in formulating a pigment composition of the above components. The resulting daylight fluorescent resin material has a bright orange color.

EXAMPLE 8

Preparation of Letter-Press Ink of the Pigment in Example 7

A letter-press ink is formulated to contain the following:

| | Percent by wt. |
|---|---|
| Resin of Example 7 | 51.0 |
| Butyl Carbitol acetate | 28.0 |
| Pigment of the orange fluorescent dye embodied in a polyvalent metal-alkyd resin complex as prepared by French patent No. 1,064,955 | 18.0 |
| Dried silica gel (Santocel) | 3.0 |

The foregoing components are mixed and then ground over a three-ball mill. The resulting daylight fluorescent ink may be printed on conventional letter-press equipment.

EXAMPLE 9

Preparation of Daylight Fuorescent Yellow Pigment

A yellow daylight fluorescent pigment composition is formulated of the following:

| | Percent by wt. |
|---|---|
| Toluenesulfonamide - formaldehyde resin (Santolite MHP-Monsanto) | 45.1 |
| 3,3-di(2,4-diamino-s-triazino-6-ethyl)-2-butanone | 28.2 |
| Formalin (37% formaldehyde) | 24.3 |
| Brilliant Yellow 6G Base | 2.4 |

The procedure described in Example 3 is followed in formulating a pigment composition containing the foregoing components. The resulting daylight fluorescent resin material has a bright yellow color.

EXAMPLE 10

Preparation of Daylight Fluorescent Letter-Press Ink

| | Percent by wt. |
|---|---|
| Quickset varnish | 43.0 |
| Gloss varnish | 18.4 |
| Pigment of Example 9 | 36.5 |
| Cobalt naphthenate (6%) | 0.6 |
| Phthalocyanine green | 1.5 |

The above components are mixed together, and milled on a roller mill. The resulting composition can be used as a printing ink with conventional letter press equipment.

EXAMPLE 11

Preparation of tetra-(beta-cyanoethyl) Cyclopentanone

Tetra-(beta-cyanoethyl)cyclopentaone is prepared in accordance with the method described in Example 1 of U.S. Pat. No. 2,386,737 by reacting cyclopentanone dissolved in benzene with acrylonitrile in the presence of trimethyl-benzyl ammonium hydroxide.

The resulting product is separated from the reaction mixture, and is found to have a melting point of 173–174° C.

EXAMPLE 12

Preparation of tetra-2,2,5,5-(2,4-diamino-s-triazino-6-ethyl)cyclopentanone

The tetra-(beta-cyanoethyl)cyclopentanone prepared in Example 11 is reacted with dicyanodiamide in the manner described in Example 2.

The product is separated from the reaction mixture in a yield of 80%. It is found to have a melting point of 334–338° C. and the following structural formula:

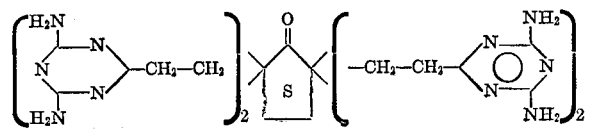

EXAMPLE 13

Preparation of Daylight Fluorescent Pigment (Pink)

Utilizing the procedure described in Example 3, a pigment composition is formulated to include the following:

| | G. |
|---|---|
| Paratoluenesulfonamide | 100.0 |
| Tetra-beta-(2,4-diamino-s-triazino - 6 - ethyl)cyclopentanone | 40.0 |
| Paraformaldehyde | 33.0 |
| Rhodamine BX | 2.3 |

As will be appreciated by those skilled in the art, the tetra - beta - (2,4 - diamino - s - triazino - 6 - ethyl)cyclopentanone prepared in Example 12 can also be used in formulating compositions of the types described in Examples 4, and 7 to 10.

It will be apparent from the foregoing that I have provided new and improved triazine compounds which can be used in the preparation of new and improved daylight fluorescent pigment compositions having improved stability and light fastness, particularly when exposed to outdoor conditions. The pigment composition of the present invention can conveniently be formulated into paints and ink compositions as well as plastic compositions to impart color to the plastic materials.

It will be understood that various changes and modifications can be made in the details of procedure, formulation and use without departing from the spirit of the invention, especially as defined in the following claims.

I claim:

1. A daylight fluorescent composition comprising the combination of a daylight fluorescent dyestuff in a resinous base formed by the co-condensation of an aryl sulfonamide selected from the group consisting of benzene sulfonamide, ortho-toluene sulfonamide, para-toluene sulfonamide, naphthalene trisulfonamide and mixtures thereof, an aldehyde selected from the group consisting of formaldehyde, benzaldehyde, glyoxal, pyruvic aldehyde and acetaldehyde, and a triazine selected from the group consisting of tetra-2,2,5,5-(2,4-diamino-s-triazino-6-ethyl) cyclopentanone and tetra-2,2,5,5-(2,4-diamino-s-triazino-6-ethyl)cyclohexanone with the triazine present in an amount to provide a mole ratio of less than one mole of the triazine per mole of the aryl sulfonamide, and the aldehyde being present in an amount to provide a mole ratio of up to two moles of aldehyde per mole of aryl sulfonamide.

2. A composition as defined in Claim 1 wherein said triazine is present in an amount within the range of 1 to 15 moles per mole of said aryl sulfonamide.

3. A composition as defined in Claim 1 wherein said aldehyde is formaldehyde.

4. A composition as defined in Claim 1 wherein said aryl sulfonamide and said aldehyde are separately reacted by condensation to an intermediate stage of polymeric growth.

References Cited

UNITED STATES PATENTS 3,642,650  2/1972  McIntosh _____ 252—301.2 R

DANIEL E. WYMAN, Primary Examiner

H. P. DEMERS, Assistant Examiner

U.S. Cl. X.R.

106—288 Q; 252—301.3 R; 260—29.1 R, 31.2 R, 41 R, 41 A, 41 C